Aug. 3, 1943.  J. A. HUTCHESON  2,326,033
APPARATUS FOR VIBRATION TESTING
Filed Aug. 2, 1940
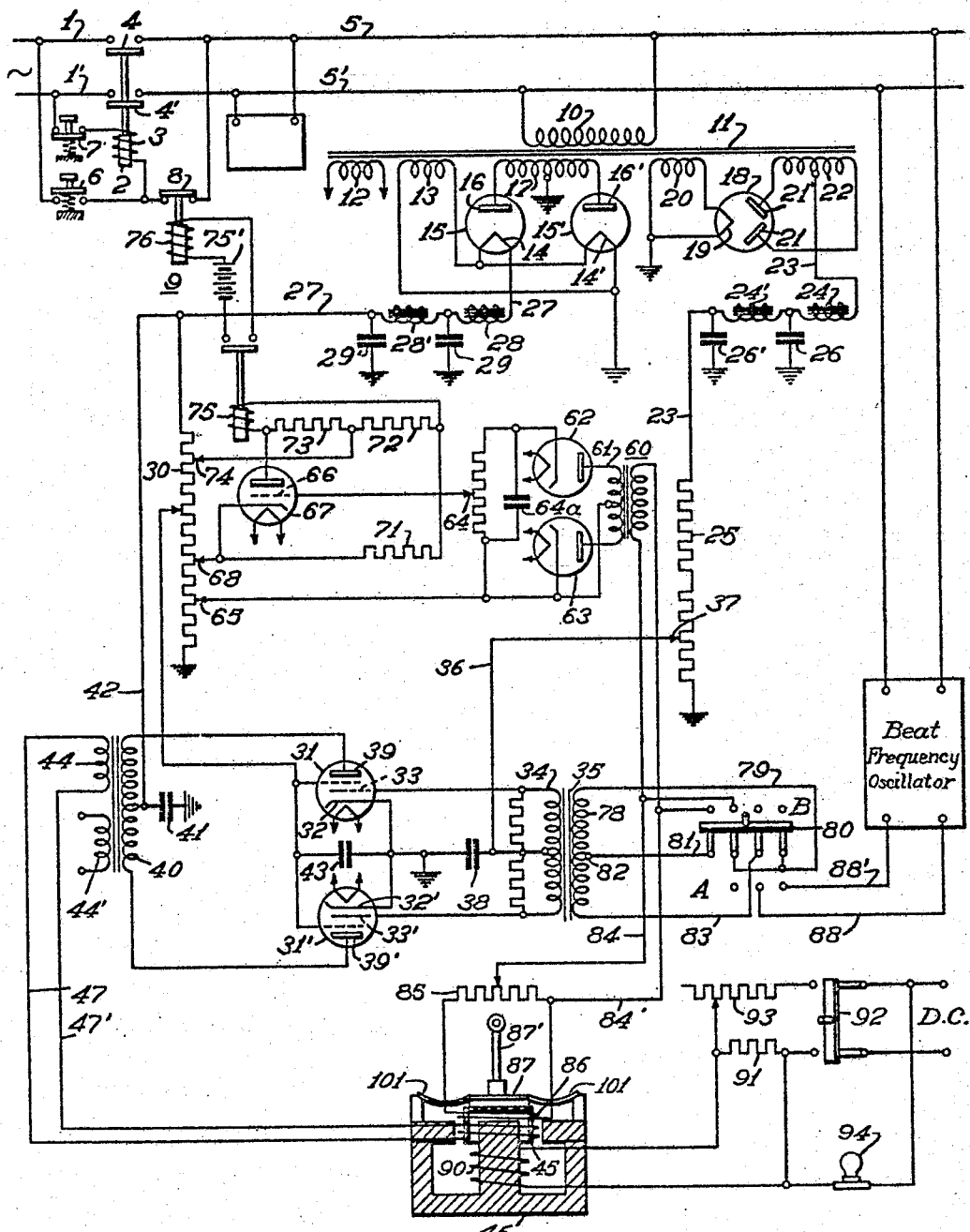
WITNESSES:
INVENTOR
John A. Hutcheson.
BY
ATTORNEY

UNITED STATES PATENT OFFICE 2,326,033

APPARATUS FOR VIBRATION TESTING

John A. Hutcheson, Catonsville, Md., assignor to Westinghouse Electric & Manufacturing Company, East Pittsburgh, Pa., a corporation of Pennsylvania Application August 2, 1940, Serial No. 349,403

1 Claim. (Cl. 73—51)

This invention relates to apparatus for testing the physical properties of materials, and more particularly to testing of fatigue under vibratory tension.

The primary object of this invention is the provision of efficient yet simple coordination of means for vibrating materials or mechanical systems over a wide range of frequencies, in order to produce therein artificially, within a relatively short time, mechanical stresses to which such materials or systems may be exposed under operating conditions in their intended fields.

Fatigue tests of different materials or mechanical assemblies composed thereof are difficult to perform, requiring considerable time and troublesome apparatus. Heretofore, such tests were frequently performed by machines which produced the required stresses in a specimen by purely mechanical power transmissions at an arbitrary rate, the frequency thereof being limited to a narrow range due to the mechanical inertia of the component parts. Especially in testing vibratory tensions, the natural periodicity of vibration of the specimen under test could not be accomplished within the narrow frequency range of such apparatus.

A particular feature of the present invention resides in the wide frequency range of the apparatus which is progressively adjustable whereby the natural vibration frequency of the specimen under test may easily be determined, and furthermore vibration at this desired frequency automatically maintained at the proper amplitude.

In conducting fatigue tests which usually must run for a considerable period of time, it is extremely desirable to be able to inspect the specimen under tests at the critical period just before its physical structure is disrupted at a time when changes take place therein which ultimately will cause its failure.

It has been found that a test specimen when vibrated by a motor supplied from a constant-voltage power source quickly attains a steady-state amplitude of vibration which continues until the vibrations begin to cause mechanical failure in the specimen, whereupon the vibration amplitude undergoes a change. A salient feature of the present invention is that means are provided for automatically stopping the operation of the apparatus at a desired and predetermined phase in the operating cycle when changes in the amplitude of vibration of the object under test is indicative of ensuing failure. In this manner, the object subjected to test can be observed in order to determine the physical changes prior to such ultimate physical destruction which often obliterates the marks of the incipient cause producing it.

The apparatus in accordance with the present invention is a modification of that described in my copending application Serial No. 249,259, filed January 4, 1939, for Vibration fatigue apparatus, and assigned to the Westinghouse Electric & Manufacturing Company, and comprises electromechanical means for producing vibratory tension in materials to be tested together with means for maintaining the tension at a frequency rate corresponding to the natural frequency of the material, and means which respond to any deviation from an initial amplitude of vibration and operates automatically to stop the application of further vibratory tension.

Further objects and advantages will be apparent from the following description of the invention, particularly pointed out in the appended claim, and taken in connection with the accompanying drawing, which is a schematic circuit diagram of the apparatus.

Referring to the drawing, an alternating-current supply line 1 and 1', controlled by a circuit breaker 2 having winding 3 and contacts 4 and 4', is connected by means of conductors 5 and 5' to the various components of the apparatus. The circuit breaker 2 has its winding 3 connected in such manner that upon completion of the circuit through the "start" button 6 it is energized from the power supply line and remains in the energized position until the circuit is broken by either the "stop" button 7 or the contacts 8 of the relay 9. The power supply line conductors 5 and 5' are connected to the primary winding 10 of the power transformer 11 and to the energizing circuit of a beat frequency oscillator diagrammatically represented by a conventional square. The power transformer 11 has a number of secondary windings, of which 12 supplies the required potential for the filaments of the various tubes utilized in the apparatus. The winding 13 supplies voltage to the filaments 14 and 14' of the rectifier tubes 15 and 15' connected in full-wave operation, the anodes 16 and 16' thereof being connected to the high potential secondary winding 17 of the power transformer 11, which is center tapped to ground of the system. A second rectifier tube 18 in full-wave operation has its filament 19 connected to another secondary winding 20 of the power transformer 11, the anodes 21 and 21' being connected to the secondary winding 22 thereof. The midpoint of the secondary winding 22 is connected by means of conductor 23 in series with filter reactors 24 and 24' through one terminal of the voltage divider resistor 25, the other terminal of which is connected to ground. Completing the circuit to the rectifier tube 18, the filament 19 thereof is also grounded. Condensers 26 and 26' connected to the reactors 24 and 24' and ground complete the filter circuit for the rectifier 18. Similarly, the filaments 14 and 14' connect by means of conductor 27 through filter reactors 28 and 28', bypassed by condensers 29 and 29' to one terminal of a voltage dividing resistor 30, the other terminal of which is grounded.

The rectifier systems herein described furnish the operating potentials for the anodes and grids of the tube utilized. The potential across the resistor 30 will be increased in the positive direction from the grounded terminal thereof, whereas across the resistor 25 this condition is reversed and the potential will be more negative with respect to ground.

The main components of the apparatus comprise a beat frequency oscillator, formerly mentioned which is of the type that can be varied in frequency output in the audio frequency range from approximately 10 to 10,000 cycles, a power amplifier, which can be excited either from the oscillator or from another source, and an amplitude responsive circuit which actuates the relay 9.

The power amplifier consists of a pair of power amplifier tubes 31 and 31' connected in push-pull operation. The input circuit between interconnected and grounded cathodes 32 and 32' and grids 33 and 33', respectively, comprises the divided portions of winding 34 of the input transformer 35, the center tap of the winding 34 being connected by conductor 36 to a suitable tap 37 of the voltage divider 25. The bypass condenser 38 between the center tap of the winding 34 and ground provides a low impedance of audio frequency currents to the cathodes 32 and 32'.

In the output circuit of the amplifier, the anodes 39 and 39' are connected to the output transformer winding 40, the center tap of which bypassed by condenser 41 is connected by means of conductor 42 to a suitable tap of the voltage divider 30. The power amplifier tubes shown here are of the type known as output beam tubes, having also a screen electrode, which are connected together and also to the conductor 42. Being thereby of a potential supplied to the anodes, the screen electrodes are bypassed by condenser 43. The output transformer is shown having two secondary windings 44 and 44'. One of these windings 44 is connected to the armature winding 45 of the vibration motor 46 by means of conductors 47 and 47'. The secondary winding 44' is not connected anywhere in the system, and is for the purpose to supply energy to a different type of vibration motor than is shown here.

Referring now to the input circuit of the amplifier 31, 31', the input transformer 35 has a divided primary winding 78, one terminal of which through conductor 79 connects to two moving arms of a four-pole, double-throw switch 80. Another moving arm of the switch connects through conductor 81 to the tap 82 of the winding 78, whereas the other terminal thereof connects through conductor 83 to the remaining moving arm of the switch 80. Two contacts of the switch 80 in one position of the arm thereof connect through conductors 84 and 84' to a potentiometer 85, the resistance of which is in parallel with another winding 86 of the armature 87 of the vibration motor 46. The armature 87 is provided with spring supports 101 which permit armature 45 to vibrate and with a suitable mechanical coupling means shown here in the form of a bar 87' for transmitting the vibratory motion to various specimens under fatigue tests. The other two contacts in the reverse position of the switch 80 connect through conductors 88 and 88' to the terminals of the beat frequency oscillator.

In order to discontinue the vibration of the test piece when mechanical failure is about to occur therein, the following circuit arrangement is used: Extensions of the leads 84, 84' are connected to the primary winding 60 of a transformer having its secondary windings 61 connected in the same push-pull arrangement to the anodes of two thermionic rectifiers 62, 63. In series with this pair of rectifiers is connected a potentiometer 64 shunted by a smoothing capacitor 64a in accordance with conventional practice. The negative end of the resistor 64 is connected to a variable tap 65 on the potentiometer 30, and the movable tap on the potentiometer 64 is connected to the grid 66 of an amplifier tube 67 of suitable type. The cathode of the amplifier 67 is connected by a variable tap 68 to the potentiometer 30 and also through three serially-connected resistors 71, 72 and 73 to the anode of the tube 67. The common junction of the resistors 72 and 73 is connected to a variable tap 74 on the potentiometer 30, and the tap 74 is also connected through the energizing winding 75 of a relay, the other end of said energizing winding being connected to the comon terminal of the resistors 71 and 72. A pair of separable contacts, controlled by the winding 75, is connected in series with a source of voltage 75' and the control winding 76 of the relay 9 which has previously been described as controlling the main circuit breaker contacts 4, 4'.

It will be noted that tube 67 and the three resistors 71, 72 and 73 form a bridge connection in which the winding 75 is connected across one diagonal, while voltage derived from the potentiometer 30 is connected across the other diagonal. The equivalent resistance of the tube 67 may be varied by varying the potential of its grid 66 relative to its cathode, and this latter may be accomplished by varying the setting of the variable tap on the resistor 64. The current through the winding 75, which is connected across a diagonal of the above-mentioned bridge, may accordingly be made zero or adjusted to any other desired value by varying the variable tap on the resistor 64.

The field winding 90 of the vibration motor 46 is paralleled by a field discharge resistor 91 and connects by means of switch 92 and series resistor 93 to a suitable direct-current potential source. A pilot light 94 is provided to indicate energization of the winding 90.

Describing the operation of the system herein disclosed, let it be assumed that the power switch 2 and the switch 92 are in closed position, whereby the necessary alternating and direct-current supply potentials are connected to the system. The amount of power expended in the field winding 90 can be controlled by the resistor 93, and the presence of field voltage across this winding is indicated by the pilot light 94. The resistor 91, as previously stated, limits excessive voltage across the field winding due to self-induction when the switch 92 is opened. During the operation of the equipment, it is desirable that the field winding 90 be operated at minimum value which will produce satisfactory output of the vibration motor 46. The application of alternating-current energizes also the audio frequency or beat frequency oscillator.

The output of the bias rectifier 18 is filtered by reactors 24 and 24', capacitors 26 and 26', and is impressed across voltage divider resistor 25. This provides proper bias for the operation of the vacuum tubes in the amplifier and amplitude responsive control tubes. The output of the rectifier tubes 15 and 15' is filtered by reactors 28 and 28', capacitors 29 and 29', and is impressed across the voltage divider 30. This supplies anode potential to the tubes aforementioned.

As shown in the drawing, when switch 80 is closed downward the beat frequency oscillator output is directly connected across the primary winding 78 of the input transformer 35. In this particular position, the amplifier is excited by the oscillator output voltage, and the amplifier output will energize the winding 45 of the vibration motor armature 87. The test specimen will vibrate at the frequency determined by the setting of the oscillator which may be varied between a wide range, as previously stated. The vibration motor will operate as long as switch 2 is closed, and thereby power will be delivered to the system. The opening of this switch can be manually effected by pressing button 7 or by energizing the winding 76 of the relay 9, which then opens the contact 8.

As the test specimen vibrates, a voltage will be generated in the winding 86, and this voltage will be impressed through the primary winding 60 on the rectifier tubes 62, 63 and thus produce a direct-current potential drop through the resistor 64. The variable tap on the resistor 64 may then be set to so adjust the equivalent resistance through the tube 67 that current through the winding 75 is insufficient to move the contacts of the relay associated with winding 75 from their normally open position. In consequence of this adjustment, the winding 76 of the relay 9 will be deenergized and the contact 8 of the latter remain closed, so that the contacts 4, 4' of the main power circuit breaker likewise remain closed.

When testing the fatigue characteristics of materials or mechanical systems, the oscillator output is slowly varied in frequency from a minimum to a maximum, or vice versa, and the test material put under vibratory tension over a range in frequency. At a particular frequency, it will be observed, usually by an audible indication, that the beat frequency and the natural period of vibration of the material under test coincide, in which case, the natural frequency of vibration should be maintained for the test, and the switch 80 may then be closed into its upper position, as shown on the diagram. In this position, the winding 86 is effectively connected between tap 82 and conductor 79 to a portion of the primary winding of input transformer 35. The movement of the armature 87 in the magnetic field produced by the winding 90 induces a voltage in the winding 86, which is now utilized to excite the input of the amplifier. The magnitude of voltage necessary for energizing the input of the amplifier may be determined by varying the potentiometer 85. The voltage so derived is alternating in character having a frequency corresponding to the natural frequency of vibration of the specimen, inasmuch as it is derived from the movement of the armature. The winding 86 is so connected with respect to phase relation to the input circuit of the amplifier that the voltage derived therefrom is regenerative; that is, in aiding phase relation with the voltage in the output circuit of the amplifier. The latter will operate now with the excitation from the winding 86, being entirely self-excited at the natural frequency of vibration of the specimen under test.

For a given setting of the potentiometer 85, the tubes 31, 31' will quickly bring the vibrations of the test specimen to a steady-state of amplitude. The potential drop through the resistor 64 will vary in accordance with variations in this amplitude, but the variable tap on resistor 64 may be set so as to give the current flowing through winding 75 such a low value that it is incapable of opening the contacts 8 of the relay 9. As previously stated, it has been found that the amplitude of vibration of the test specimen will remain substantially constant until mechanical failure of the latter begins to occur. When mechanical failure starts, the amplitude of vibration of the test specimen will undergo a change, thereby varying the potential drop through the resistor 64 and causing such a change in the current through winding 75 as to cause current from the voltage source 75' to open the contacts 8 and thereby open the contacts 4, 4' of the main power circuit breaker and discontinue the vibration of the test specimen.

In most cases it will be found that maximum sensitivity of the relay 9 to variations in the amplitude of vibration of the test specimen will be attained if the voltage drop through resistor 64 is opposite in polarity to that between taps 65 and 69 of potentiometer 30 as is indicated by the present drawing. However, opposition of these polarities is not absolutely essential to operativeness of my arrangement.

Since structural details of the vibration motor 46 form no part of the present invention, they will not be described, but reference is made to my copending application previously mentioned for information concerning them.

Certain subject matter described herein is claimed in my above-mentioned copending application.

I claim as my invention:

In an apparatus for testing the physical properties of materials, a reciprocating motor adapted to vibrate said materials and comprising a pair of relatively movable windings, one physically stationary relative to the support for said material and the other mechanically connected to vibrate with said material, means for energizing said one winding with direct current, an electron tube having an output circuit and a control electrode circuit, said output circuit being connected to energize said other winding, means for coupling said control electrode circuit to said output circuit with such a polarity as to cause said tube to generate electrical oscillations of the natural frequency of said material, a circuit breaker having a control circuit, a rectifier connected to supply energy from said control electrode circuit to the control circuit of said circuit breaker, a current source bucking the energy supplied by said rectifier in said control circuit, said circuit breaker being arranged to deenergize the power supply circuit for said electron tube in response to a predetermined change of current through said rectifier.

JOHN A. HUTCHESON.